US008954270B2

(12) United States Patent
Hwang et al.

(10) Patent No.: US 8,954,270 B2

(45) Date of Patent: Feb. 10, 2015

(54) SYSTEM AND METHOD FOR DETECTING ACCIDENT LOCATION

(71) Applicant: Electronics and Telecommunications Research Institute, Daejeon (KR)

(72) Inventors: Yoo La Hwang, Daejeon (KR); Byoung Sun Lee, Daejeon (KR); Jae Hoon Kim, Daejeon (KR); Do Seob Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 85 days.

(21) Appl. No.: 13/684,966

(22) Filed: Nov. 26, 2012

(65) Prior Publication Data

US 2013/0138339 A1 May 30, 2013

(30) Foreign Application Priority Data

Nov. 28, 2011 (KR) ........................ 10-2011-0125089

(51) Int. Cl.
*G01C 21/00* (2006.01)
*G08B 25/01* (2006.01)

(52) U.S. Cl.
CPC .............. *G01C 21/00* (2013.01); *G08B 25/016* (2013.01)
USPC .............. 701/468; 701/301; 701/45; 342/457

(58) Field of Classification Search
USPC ............................. 701/468, 45, 301; 342/457
See application file for complete search history.

(56) References Cited

U.S. PATENT DOCUMENTS

| | | | | |
|---|---|---|---|---|
| 5,311,197 | A * | 5/1994 | Sorden et al. | 342/457 |
| 6,249,252 | B1 * | 6/2001 | Dupray | 342/450 |
| 6,266,617 | B1 * | 7/2001 | Evans | 701/301 |
| 6,442,485 | B2 * | 8/2002 | Evans | 701/301 |
| 7,289,786 | B2 * | 10/2007 | Krasner | 455/404.2 |
| 7,375,683 | B2 * | 5/2008 | Smith et al. | 342/387 |
| 7,567,169 | B2 * | 7/2009 | Dickmann et al. | 340/436 |

FOREIGN PATENT DOCUMENTS

| | | | |
|---|---|---|---|
| KR | 1020100131409 | A | 12/2010 |
| KR | 1020110049391 | A | 5/2011 |

* cited by examiner

*Primary Examiner* — Mary Cheung
*Assistant Examiner* — Michael Berns
(74) *Attorney, Agent, or Firm* — William Park & Associates Patent Ltd.

(57) ABSTRACT

Provided is a system for detecting an accident location, including: a navigation apparatus to extract identification information of a preinstalled apparatus, first distance information between the apparatus and at least one base station, and second distance information between the apparatus and a geostationary satellite, when an impact is applied to the apparatus; and an apparatus control center to compute location information of the navigation apparatus based on the identification information, the first distance information, and the second distance information, wherein the at least one base station receives the first distance information from the navigation apparatus and transmits the first distance information to the apparatus control center, and the geostationary satellite receives the second distance information from the navigation apparatus and transmits the second distance information to the apparatus control center.

11 Claims, 5 Drawing Sheets

SYSTEM AND METHOD FOR DETECTING ACCIDENT LOCATION

CROSS-REFERENCE TO RELATED APPLICATION

This application claims the priority benefit of Korean Patent Application No. 10-2011-0125089, filed on Nov. 28, 2011, in the Korean Intellectual Property Office, the disclosure of which is incorporated herein by reference.

BACKGROUND

1. Field of the Invention

Embodiments of the present invention relate to a system and method for detecting an accident location of a vehicle based on a geostationary satellite.

2. Description of the Related Art

When a vehicle meets with an accident, a driver or a witness may contact with a police or an insurance company with respect to the scene of the accident. However, in many cases, it is difficult to verify a location of the accident and thus, the police or emergency aiders may be late dispatched to the scene of the accident and the rescue operation may not be smoothly performed.

In addition, when a vehicle accident is serious, or when an accident happens on a lonesome road, the scene of the accident may remain neglected and thus, a lifesaving operation may not be appropriately performed.

Currently, a navigation apparatus may be installed in a vehicle and thus, when an impact is applied to the vehicle, an auxiliary power apparatus and a transmit/receive antenna may operate to transmit a serial number of the vehicle and distance information to a control center, thereby enabling a location of the vehicle to be detected.

However, the navigation apparatus may not easily detect a location since a global positioning system (GPS) does not operate when an accident happens or in a dead zone having a poor communication environment.

SUMMARY

According to an aspect of the present invention, there is provided a system for detecting an accident location, including: a navigation apparatus to extract identification information of a preinstalled apparatus, first distance information between the apparatus and at least one base station, and second distance information between the apparatus and a geostationary satellite, when an impact is applied to the apparatus; and an apparatus control center to compute location information of the navigation apparatus based on the identification information, the first distance information, and the second distance information, wherein the at least one base station receives the first distance information from the navigation apparatus and transmits the first distance information to the apparatus control center, and the geostationary satellite receives the second distance information from the navigation apparatus and transmits the second distance information to the apparatus control center.

The navigation apparatus may be installed in a vehicle.

The apparatus control center may compute location information of the navigation apparatus based on first distance information received from at least three base stations, the second distance information, and the identification information.

The apparatus control center may compute accident time information of the navigation apparatus based on the first distance information, the second distance information, and the identification information.

The navigation apparatus may include an alerting unit to generate an alert when the impact is applied to the apparatus.

When the first distance information is not transmitted to the at least one base station, the alerting unit may receive alert request information from the apparatus control center to thereby generate the alert.

When the first distance information is not received from the at least one base station, the apparatus control center may receive the second distance information from the geostationary satellite to thereby transmit the alert request information to the navigation apparatus.

According to another aspect of the present invention, there is provided an apparatus for detecting an accident location, including: a determining unit to determine whether an impact is applied to a preinstalled apparatus; a power unit to supply power to the apparatus when the impact is applied to the apparatus; and a communication unit being supplied with the power to transmit identification information of the apparatus, first distance information between the apparatus and at least one base station, and second distance information between the apparatus and a geostationary satellite to the at least one base station, the geostationary satellite, and an apparatus control center.

According to still another aspect of the present invention, there is provided a method of detecting an accident location, including: receiving, from a navigation apparatus installed in an apparatus that is applied with an impact, identification information of the navigation apparatus; receiving, from at least one base station, first distance information between the navigation apparatus and the at least one base station; receiving, from a geostationary satellite, second distance information between the navigation apparatus and the geostationary satellite; and computing location information of the navigation apparatus based on the identification information, the first distance information, and the second distance information.

According to a further another aspect of the present invention, there is provided a method of detecting an accident location, including: determining whether an impact is applied to a preinstalled apparatus; supplying power to the apparatus when the impact is applied to the apparatus; and transmitting, through the power supply, identification information of the apparatus, first distance information between the apparatus and at least one base station, and second distance information between the apparatus and a geostationary satellite to the at least one base station, the geostationary satellite, and an apparatus control center.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
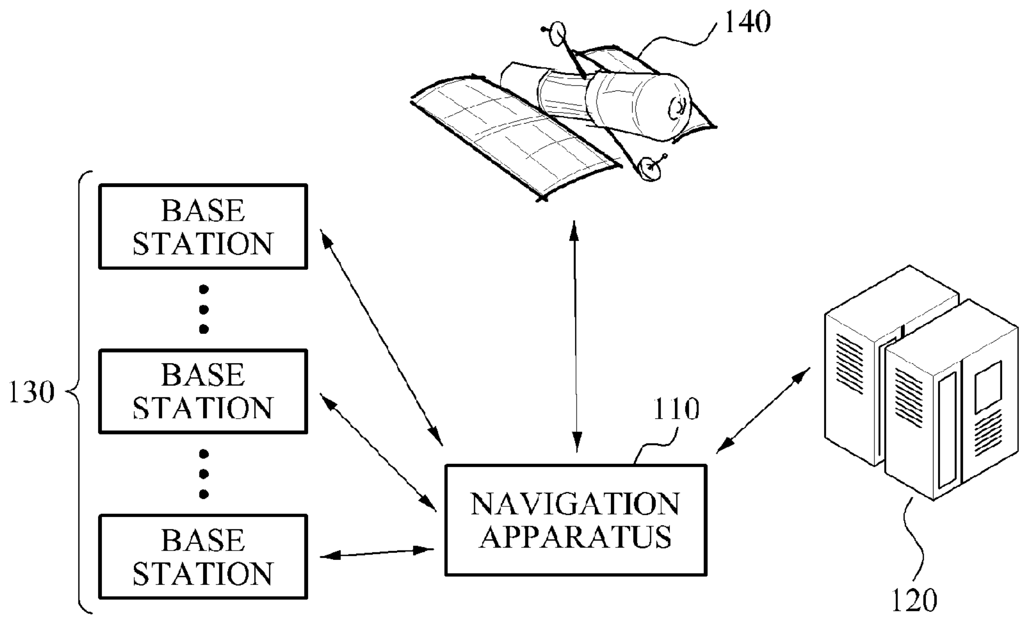
FIG. 1 is a block diagram illustrating a configuration of an accident location detecting system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

FIG. 1 is a block diagram illustrating a configuration of an accident location detecting system according to an embodiment of the present invention.

Referring to FIG. 1, the accident location detecting system may include a navigation apparatus 110 to determine whether an impact is applied to a preinstalled apparatus, at least one base station 130 to receive an accident related signal from the navigation apparatus 110, a geostationary satellite 140, and an apparatus control center 120 to receive the accident related signal and thereby detect an accident location.

More specifically, the accident location detecting system may include the navigation apparatus 110 to extract identification information of a preinstalled apparatus, first distance information between the apparatus and the at least one base station 130, and second distance information between the apparatus and the geostationary satellite 140, when an impact is applied to the apparatus, and the apparatus control center 120 to compute location information of the navigation apparatus 110 based on the identification information, the first distance information, and the second distance information.

The at least one base station 130 may receive the first distance information from the navigation apparatus 110 and transmit the first distance information to the apparatus control center 120. The geostationary satellite 140 may receive the second distance information from the navigation apparatus 110 and transmit the second distance information to the apparatus control center 120.

According to an aspect, the navigation apparatus 110 is installed in a vehicle to detect a location of a user who has met with the accident when an impact is applied to the vehicle due to a vehicle accident, but it is only an example. Accordingly, the navigation apparatus 110 may be installed to various moving objects to thereby verify an accident location when an impact is applied to a corresponding moving object.

Hereinafter, a method of detecting an accident location according to an embodiment of the present invention will be described.

Figure 2:
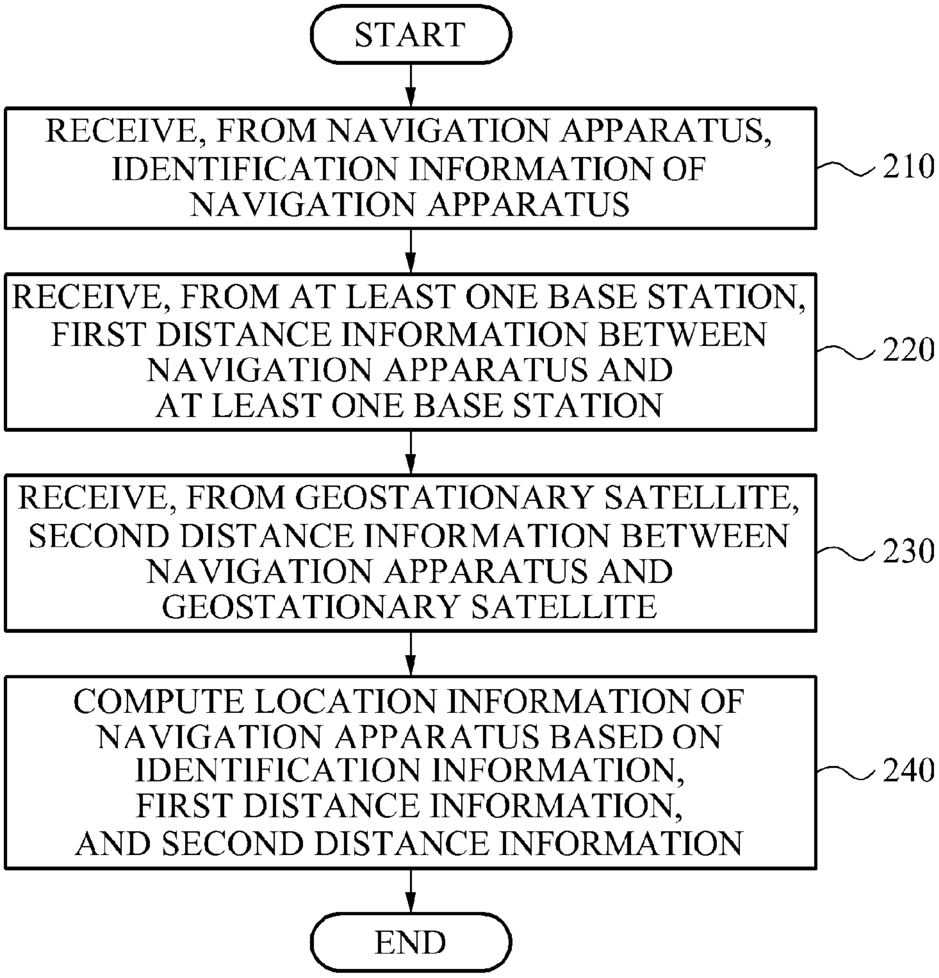
FIG. 2 is a flowchart illustrating a method of detecting an accident location according to an embodiment of the present invention.

FIG. 2 is a flowchart illustrating a method of detecting an accident location according to an embodiment of the present invention.

In operation 210, an apparatus control center according to an embodiment of the to present invention may receive, from a navigation apparatus installed in an apparatus that is applied with an impact, identification information of the navigation apparatus.

In operation 220, the apparatus control center may receive, from at least one base station, first distance information between the navigation apparatus and the at least one base station.

In operation 230, the apparatus control center may receive, from a geostationary satellite, second distance information between the navigation apparatus and the geostationary satellite.

In operation 240, the apparatus control center 120 may compute location information of the navigation apparatus based on the identification information, the first distance information, and the second distance information.

According to an aspect, the apparatus control center may compute location information of the navigation apparatus based on first distance information received from at least three base stations, second distance information, and identification information.

According to an aspect, the apparatus control center may compute accident time information of the navigation apparatus based on the first distance information, the second distance information, and the identification information.

Hereinafter, a configuration of a navigation apparatus according to an embodiment of the present invention will be described.

Figure 3:
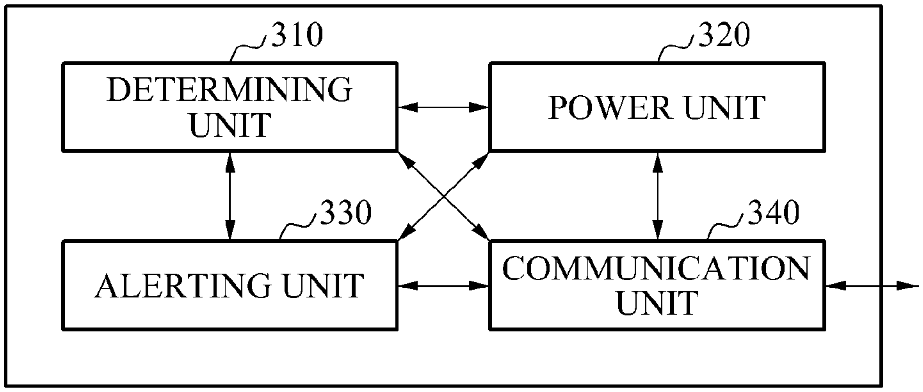
FIG. 3 is a block diagram illustrating a configuration of a navigation apparatus according to an embodiment of the present invention.

FIG. 3 is a block diagram illustrating a configuration of a navigation apparatus according to an embodiment of the present invention.

Referring to FIG. 3, the navigation apparatus may include a determining unit 310 to determine whether an impact is applied to a preinstalled apparatus, a power unit 320 to supply power to the apparatus when the impact is applied to the apparatus, and a communication unit 340 being supplied with the power to transmit identification information of the apparatus, first distance information between the apparatus and at least one base station, and second distance information between the apparatus and a geostationary satellite to the at least one base station, the geostationary satellite, and an apparatus control center.

The apparatus control center may compute location information and accident time information of the apparatus based on the identification information, the first distance information, and the second distance information and thereby transmit the computed location information and accident time information to the communication unit 340.

The navigation apparatus may include an alerting unit 330 to generate an alert when the impact is applied to the apparatus. Accordingly, when the impact is applied to the apparatus, the navigation apparatus may inform a neighborhood by generating an alert.

According to an aspect, when first distance information is not received from at least one base station, the apparatus control center may receive second distance information from the geostationary satellite to thereby transmit alert request information to the navigation apparatus.

Here, when the first distance information is not transmitted to the at least one base station, the alerting unit 330 may receive the alert request information from the apparatus control center to thereby generate the alert.

Hereinafter, a method of detecting an accident location using a configuration of a navigation apparatus according to another embodiment of the present invention will be described.

Figure 4:
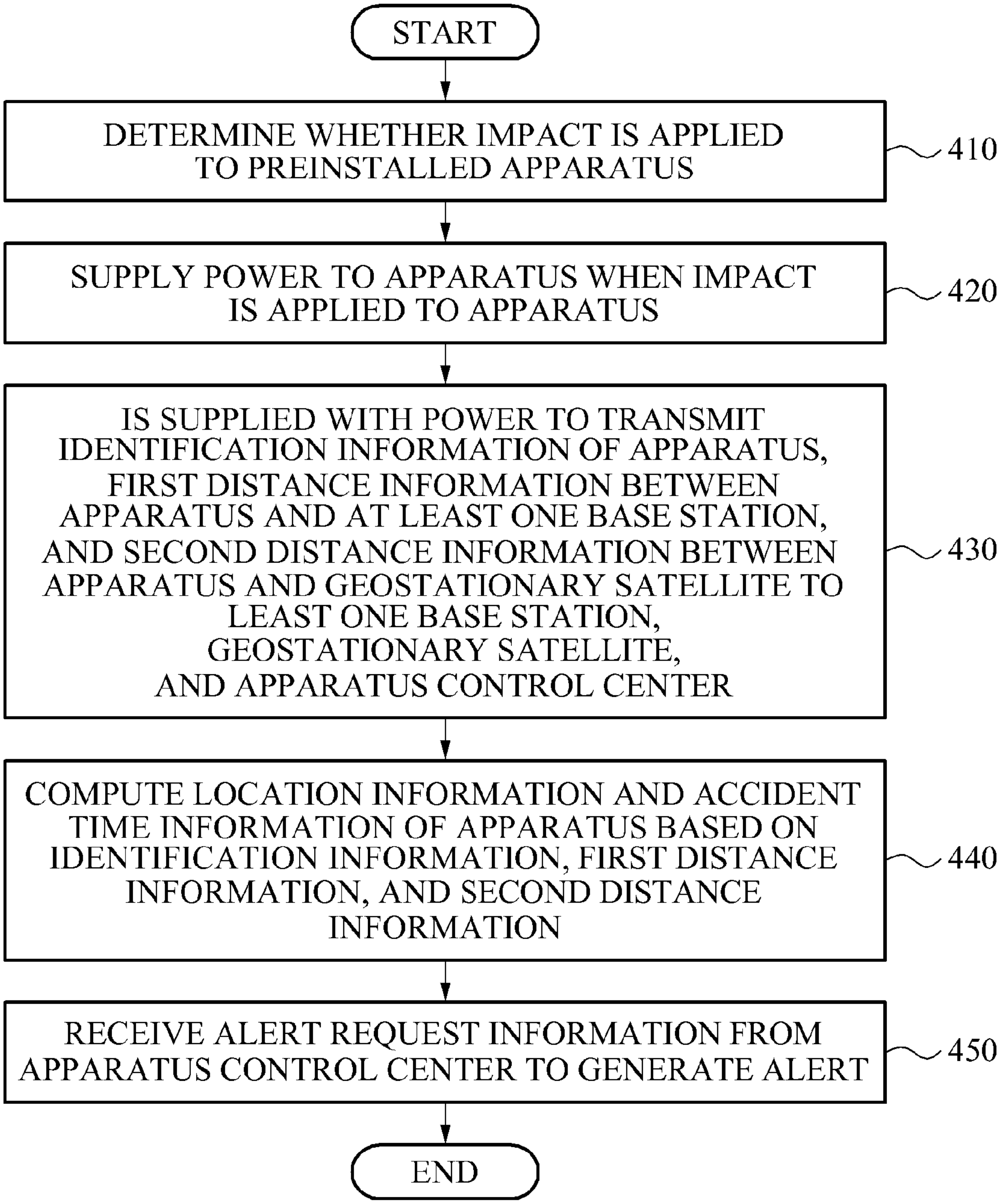
FIG. 4 is a flowchart illustrating a method of detecting an accident location according to another embodiment of the present invention.

FIG. 4 is a flowchart illustrating a method of detecting an accident location according to another embodiment of the present invention.

In operation 410, the navigation apparatus may determine whether an impact is applied to a preinstalled apparatus.

In operation 420, the navigation apparatus may supply power to the apparatus when the impact is applied to the apparatus.

In operation 430, the navigation apparatus 110 may be supplied with the power to transmit identification information of the apparatus, first distance information between the apparatus and at least one base station, and second distance information between the apparatus and a geostationary satellite to the at least one base station, the geostationary satellite, and an apparatus control center.

In operation 440, the navigation apparatus 110 may compute, using the apparatus control center, location information and accident time information of the apparatus based on the identification information, the first distance information, and the second distance information.

In operation 450, the navigation apparatus 110 may receive alert request information from the apparatus control center to thereby generate an alert.

Hereinafter, a method of detecting an accident location in an apparatus control center 120 according to an embodiment of the present invention will be described.

Figure 5:
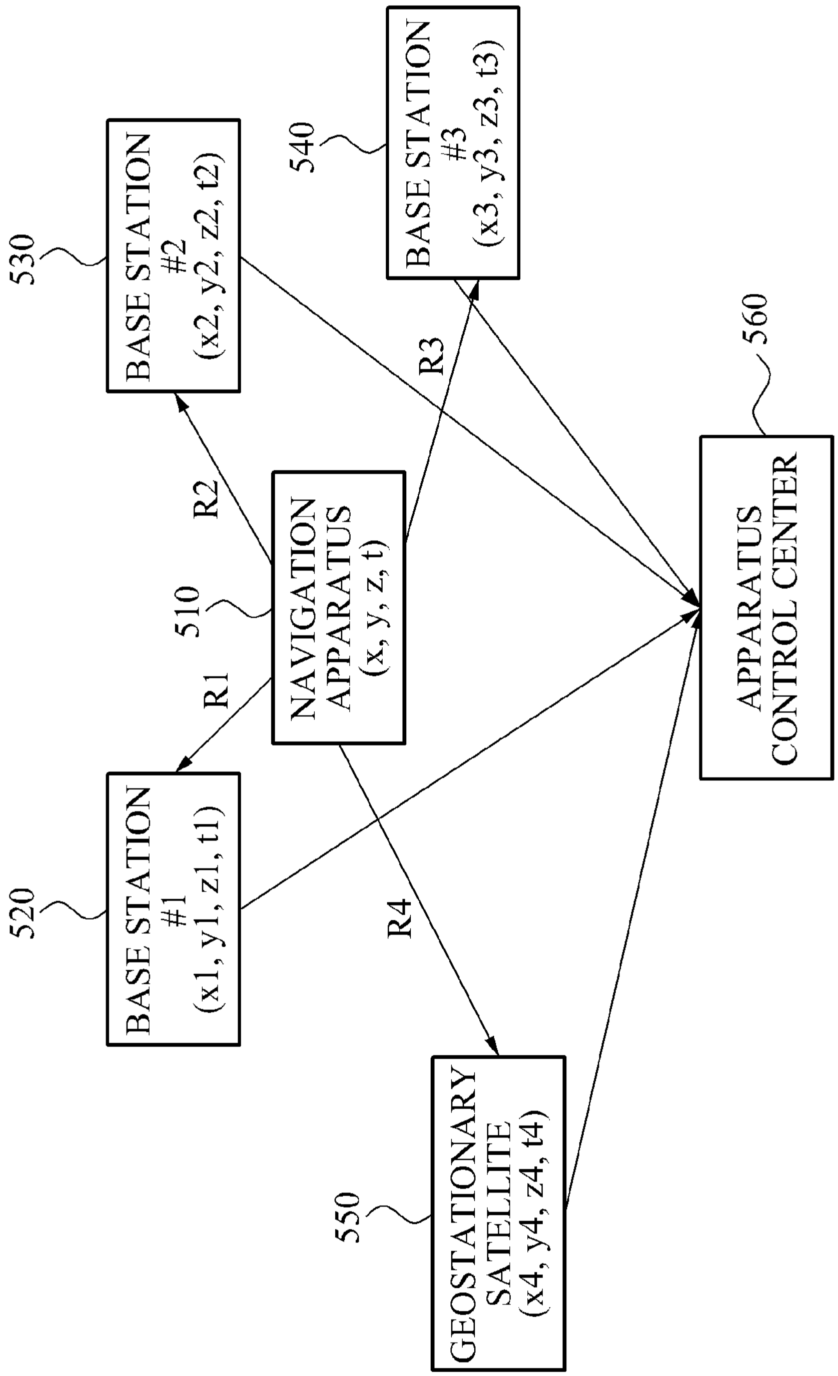
FIG. 5 is a configuration diagram to describe a process of tracking an accident location according to an embodiment of the present invention.

FIG. 5 is a configuration diagram to describe a process of tracking an accident location according to an embodiment of the present invention.

According to an aspect, an apparatus control center may compute location information of a navigation apparatus based on first distance information received from at least three base stations, second distance information, and identification information.

According to an aspect, an apparatus control center may utilize at least four pieces of distance information to compute location information and accident time information. Therefore, an example of computing the location information and the accident time information based on four pieces of distance information will be described.

Referring to FIG. 6, at least one base station, for example, a first base station 520, a second base station 530, and a third base station 540, and a geostationary satellite 550 may transmit received identification information and distance information to an apparatus control center 560.

The apparatus control center 560 may compute accident location information by employing a least square method based on four pieces of distance information.

According to an aspect, first distance information between a location (X,Y,Z,t) of a navigation apparatus 510 and each of the first base station 520 (x1,y1,z1,t1), the second base station 530 (x2,y2,z2,t2), and the third base station 540 (x3,y3,z3,t3) and second distance information between the location (X,Y,Z,t) of the navigation apparatus 510 and the geostationary satellite 540 (x4,y4,z4,t4) may be expressed according to Equation 1:

$$Rj=\text{sqrt}((X-xj)\hat{}2+(Y-yj)\hat{}2+(Z-zi)\hat{}2)+c*t \quad \text{[Equation 1]}$$

According to an aspect, j may gradually increase such as 1, 2, 3, 4, . . .

Based on the first distance information and the second distance information, the apparatus control center 560 may configure an arrangement A as shown in Equation 2:

$$Aj=[(X-xj)/Rj(Y-yj)/Rj(Z-zj)/Rj\ c] \quad \text{[Equation 2]}$$

In Equation 2, c denotes velocity of light.

According to an aspect, based on distance information R1, R2, R3, R4, and the like, the apparatus control center 560 may estimate accident location information, X, Y, and Z, and time information t using a least square method, as shown in Equation 3:

$$X=(A_j^TWA_j)^{-1}A_j^TR_j \quad \text{[Equation 3]}$$

For example, when four parameters are to be estimated and at least four pieces of distance information are present, the apparatus control center 560 may compute a desired parameter by solving simultaneous equations.

According to an aspect, the accident location detecting method may perform the above operation based on the assumption that a location of each base station is known and time information thereof is synchronized with each other.

According to embodiments of the present invention, there may be provided a system and method for detecting an accident location based on a geostationary satellite.

According to embodiments of the present invention, there may be provided a system and method for automatically transmitting accident location information to a control center when it is not easy to report an accident.

According to embodiments of the present invention, it is possible to verify an accident location with respect to a stolen vehicle.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for detecting an accident location, comprising:

a navigation apparatus configured to be mounted in a vehicle;

a preinstalled apparatus mounted in the vehicle, the navigation apparatus in communication with the preinstalled apparatus, the navigation apparatus operable to:

determine whether an impact is applied to the preinstalled apparatus, the impact indicating that an accident has occurred to the vehicle at the accident location;

in response to determining that the impact to the preinstalled apparatus has occurred, extract an identification information of the preinstalled apparatus;

extract a first distance information between the navigation apparatus and at least two base stations; and extract a second distance information between the navigation apparatus and a geostationary satellite; and an apparatus control center in communication with the navigation apparatus, the apparatus control center computing location information of the navigation apparatus and the accident location based on the identification information, the first distance information, and the second distance information, wherein at least one base station receives the first distance information transmitted from the navigation apparatus and transmits the first distance information to the apparatus control center, and the geostationary satellite receives the second distance information transmitted from the navigation apparatus and transmits the second distance information to the apparatus control center, wherein the navigation apparatus comprises an alerting unit to generate an alert when the impact is applied to the apparatus, and wherein the alerting unit receives alert request information from the apparatus control center to thereby generate the alert.

2. The system of claim 1, wherein the apparatus control center computes location information of the navigation apparatus based on the first distance information received from at least three base stations, the second distance information, and the identification information.

3. The system of claim 1, wherein the navigation apparatus further comprises:

a determining unit to determine whether an impact is applied to the preinstalled apparatus;

a power unit coupled to the determining unit, the power unit supplying power to the navigation apparatus when the impact is applied to the preinstalled apparatus; and a communication unit coupled to the determining unit and the power unit, the power unit supplying power to the communication unit, the communication unit transmitting identification information of the preinstalled apparatus, first distance information between the apparatus and at least one base station, and second distance information between the apparatus and a geostationary satellite to the at least one base station, the geostationary satellite, and an apparatus control center.

4. A method of detecting an accident location, comprising:

determining, via a navigation apparatus, whether an impact is applied to a preinstalled apparatus, the navigation apparatus and the preinstalled apparatus mounted in a vehicle, the navigation apparatus in communication with the preinstalled apparatus, the impact indicating that an accident has occurred to the vehicle at the accident location;

in response to determining that the impact to the preinstalled apparatus has occurred, extracting an identification information of the navigation apparatus;

transmitting, from the navigation apparatus, a first distance information between the navigation apparatus and at least two base stations to the at least two base stations;

transmitting, from the navigation apparatus, a second distance information between the navigation apparatus and the geostationary satellite to the geostationary satellite;

receiving, at the apparatus control center, the identification information of the navigation apparatus;

receiving, at the apparatus control center, the first distance information between the navigation apparatus and the at least two base stations from the at least two base stations;

receiving, at the apparatus control center, the second distance information between the navigation apparatus and the geostationary satellite from the geostationary satellite; and computing, via the apparatus control center, the accident location based on the identification information, the first distance information, and the second distance information, wherein the navigation apparatus comprises an alerting unit to generate an alert when the impact is applied to the apparatus, and wherein the alerting unit receives alert request information from the apparatus control center to thereby generate the alert.

5. The method of claim 4, wherein the accident location is computed based on first distance information received from at least three base stations, the second distance information, and the identification information.

6. The method of claim 4, wherein the navigation apparatus generates an alert when the impact to the preinstalled apparatus has occurred.

7. The method of claim 4, wherein the navigation apparatus receives alert request information from the apparatus control center and generates an alert.

8. The method of claim 4, wherein the navigation apparatus further comprises a determining unit to determine whether the impact to the preinstalled apparatus has occurred.

9. The method of claim 4 further comprising:

supplying power to the navigation apparatus when the impact to the preinstalled apparatus has occurred, the power being supplied from a power unit coupled to the navigation apparatus.

10. The method of claim 9, wherein the navigation apparatus further comprises a communication unit coupled to the power unit, the power unit supplying power to the communication unit when the impact to the preinstalled apparatus has occurred.

11. The method of claim 10, wherein the communication unit transmits the identification information, the first distance information and the second distance information.

* * * * *